(12) United States Patent
Denison

(10) Patent No.: US 7,078,916 B2
(45) Date of Patent: Jul. 18, 2006

(54) LINEARITY ENHANCEMENT FOR CAPACITIVE SENSORS

(75) Inventor: Timothy J. Denison, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 20 days.

(21) Appl. No.: 10/818,863

(22) Filed: Apr. 6, 2004

(65) Prior Publication Data
US 2005/0218911 A1    Oct. 6, 2005

(51) Int. Cl.
*G01R 27/26* (2006.01)
(52) U.S. Cl. .................. 324/661; 324/684; 324/686
(58) Field of Classification Search ................ 324/661, 324/684, 686, 669; 73/862.1, 514.32
See application file for complete search history.

(56) References Cited

U.S. PATENT DOCUMENTS

| | | | |
|---|---|---|---|
| 4,683,754 A | | 8/1987 | Hirata et al. |
| 5,194,819 A | | 3/1993 | Briefer |
| 5,343,766 A | * | 9/1994 | Lee ........................ 73/862.61 |
| 5,454,266 A | * | 10/1995 | Chevroulet et al. ...... 73/514.18 |
| 5,612,494 A | * | 3/1997 | Shibano ................... 73/514.32 |
| 6,257,061 B1 | | 7/2001 | Nonoyama et al. |
| 6,530,235 B1 | | 3/2003 | Hallocke et al. |

FOREIGN PATENT DOCUMENTS

FR    2706038    6/1993

OTHER PUBLICATIONS

Joseph I. Seeger et al, Jun. 8, 2003, Negative Capacitance for Control of Gap-Closing Electrostatic Actuators.
Yuming Cao et al, Sep. 1994, "High-Accuracy Circuits for On-Chip Capacitance Ratio Testing or Sensor Readout", IEEE Transactions on Circuits and Systems—II: Analog and Digital, Signal Processing, vol. 41, No. 9.
Yuming Cao et al., 1995, "CMOS Circuits for On-Chip Capacitance Ratio testing or Sensor Readout", IEEE.
H. Leuthold et al., 1990, "An ASIC for High-resolution Capacitive Microaccelerometers,", A21-A23 (1990) 278-281.
Jun. 22, 2005, International Search Report.

* cited by examiner

*Primary Examiner*—Vincent Q. Nguyen
*Assistant Examiner*—John Teresinski
(74) *Attorney, Agent, or Firm*—Bromberg & Sunstein LLP

(57) ABSTRACT

A method for enhancing the linearity of a differential capacitive sensor as a function of beam displacement. An ac-modulated feedback connection from a sensor output terminal to a movable beam electrode is provided through a fix-up capacitor. The output terminal signal is inverted in the feedback connection so that the fix-up capacitor reduces the capacitance from the fixed electrodes to the beam electrode. When the fix-up capacitor value is chosen approximately equal to the fixed capacitance of the differential capacitor, the feedback circuit compensates for the effect of this fixed capacitance. The linearity of the output as a function of the displacement of the beam is improved. Thus, the signal-to-noise ratio of devices such as accelerometers may be increased by allowing sensors to employ a large displacement range. The invention may be used in differential accelerometers and in other types of differential capacitive sensors.

17 Claims, 4 Drawing Sheets

LINEARITY ENHANCEMENT FOR CAPACITIVE SENSORS

TECHNICAL FIELD

The present invention relates to methods of improving the linearity of response for capacitive sensors, particularly differential capacitive sensors.

BACKGROUND

Capacitive sensors are used in many applications. For example, such sensors are used in micromachined accelerometers to sense acceleration for a variety of applications, including sensing the acceleration that occurs as a result of an automobile accident in order to trigger an air bag, or sensing the acceleration resulting from an earthquake in order to automatically shut off a gas line to prevent fires. Other applications of capacitive sensors include pressure sensors for biological and industrial measurements and fluid level monitors.

In one type of micromachined device, a polysilicon mass called a "beam" is suspended over a substrate by supporting tethers. The beam, which is essentially parallel to the substrate, has a mass elongated along an axis, and a number of fingers that extend away from the mass in a direction perpendicular to the axis of the mass. The beam and fingers are movable laterally relative to the substrate along the axis. Each of these movable fingers is positioned between two polysilicon fingers that are in the plane of the beam and are fixed relative to the substrate. Each movable finger and the fixed fingers on either side of the movable finger form a differential capacitor cell. The cells additively form a differential capacitor. A structure of this type is shown, for example, in U.S. Pat. No. 5,345,824, which is incorporated herein by reference.

Different approaches can be used to sense acceleration with a differential capacitor. One approach is to use charge balanced feed back. The movable fingers (i.e., movable with the beam) are each centered between two fixed fingers. All the fixed fingers on one side of the movable fingers are electrically coupled together, and all the fixed fingers on the other side of the movable fingers are also electrically coupled together. The two sets of fixed fingers are at different DC potentials and are driven with AC carrier signals that are 180 degrees out of phase with respect to each other. In response to an external force/acceleration along a sensitive axis, the beam with movable fingers moves toward one or the other set of fixed fingers. The signal on the beam is amplified, demodulated, and provided to an output terminal. A feedback network connects the output terminal and the beam. As shown in FIG. 1, the common-mode potential $V_{cm}$ is servoed so that the net charge delivered to the summing node is nulled out during each clock cycle.

Charge balanced feedback has the advantage of suppressing nonlinear electrostatic effects while allowing for the sensor beam to move freely. The response of the sensor is approximately linear for small displacements about the equilibrium position. The response may become non-linear for larger displacements due to fringing field effects related to the fingers, among other causes. It is desirable to maintain the linearity of the output of the sensor as a function of the displacement for larger displacements to provide increased sensitivity and an improved signal-to-noise ratio.

SUMMARY OF THE INVENTION

In various preferred embodiments of the present invention, a method of improving the output linearity of differential capacitive sensors is provided. The output of these differential sensors includes a term that is approximately linear in the displacement of a movable electrode with respect to a fixed electrode. The output also includes non-linear terms that are due in part to a fixed portion of the sense capacitance which is not correlated to the movable electrode's displacement. The method includes feeding back the sensor output signal to the movable electrode, after the signal has been appropriately shifted in phase, modulated and fed through a fix-up capacitor. Thus, the charge induced by the sense capacitors' fixed term may be cancelled. The result of this "negative" capacitance is to substantially cancel the effect of the fixed portion of the sense capacitance, improving the linearity of the differential sensor's output.

In other embodiments of the invention, this method may be applied to a differential accelerometer by providing cross-coupled fix-up capacitors.

In further specific embodiments of the invention, the feedback approach described for the preceding embodiments may be combined with other signal processing techniques to cancel both the fixed term and higher order non-linear terms in the signal output from the sensor.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

The "linearity" of a sensor's output shall mean the root-mean-square deviation of the sensor's output from a straight line over an interval of interest. Linearity is "improved" when the linearity of the output of the sensor is reduced.

In various preferred embodiments of the present invention, a method of improving the output linearity of differential capacitive sensors is provided. The output of these differential sensors includes a component that is approximately linear in the displacement of a movable electrode with respect to a fixed electrode of the differential capacitor. The output of the sensor also includes a component that is not correlated to the movable electrode displacement plus higher order terms in the displacement. The method includes feeding back the sensor's output signal to the movable electrode, after the output signal has been shifted in phase by 180 degrees, modulated and passed through a fix-up capacitor. If the fix-up capacitor's value is set appropriately, the negative capacitance thus provided can substantially cancel the effect of the static capacitance component of the sense capacitor. Thus, the nonlinearity of the sensor output may be substantially reduced.

Figure 1:
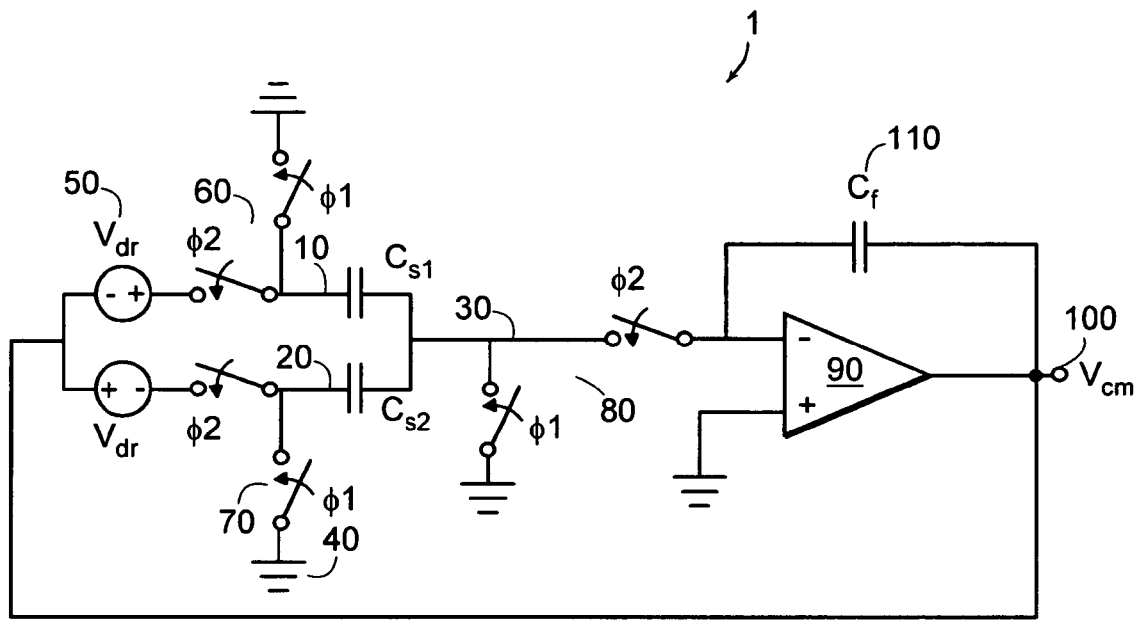
FIG. 1 is a schematic diagram of a prior art differential capacitive sensor.
Figure 2:
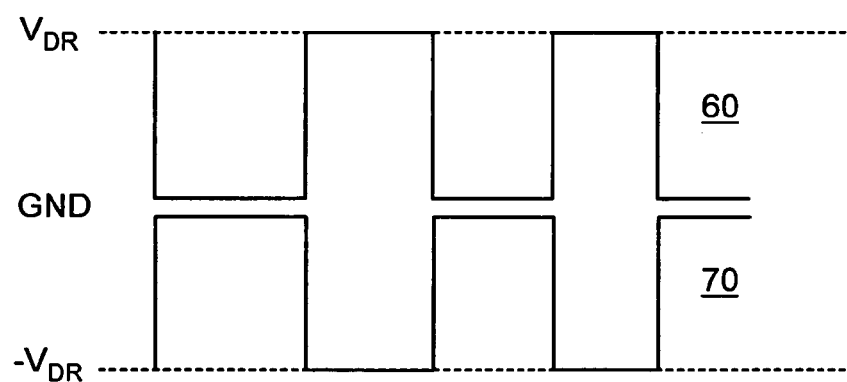
FIG. 2 shows an ac-modulated carrier signal at points in the circuit of FIG. 1 for zero sensor displacement.

Referring to FIG. 1, the movable fingers (i.e., movable with the beam) 30 are each centered between two fixed fingers (10, 20). All the fixed fingers on one side of the movable fingers 10 are electrically coupled together, and all the fixed fingers on the other side of the movable fingers 20 are also electrically coupled together. The two sets of fixed fingers (60, 70) are driven with potentials "$V_{dr}$" 50 as shown in FIG. 2 In response to an external force/acceleration along a sensitive axis, the beam with movable fingers moves toward one or the other set of fixed fingers. The signal on the beam is demodulated 80, amplified 90, and provided to an output terminal 100. A feedback network 110 connects the output amplifier terminal and the beam. This feedback causes the net charge delivered by the AC excitation to be nulled. The signal at the output terminal 100 is a measure of the sensor displacement and is therefore proportional to acceleration.

$C_{S1}$ and $C_{S2}$ in FIG. 1 vary with the displacement of the beam and can be represented generally as the superposition of a static term and terms that vary as a function of the displacement, as shown in eqn. 1.

$$C_{s1} = C_o + C_{sx}/(1 + \Delta/g_0) + \sum_{n=2}^{\infty} C_n/(\Delta/g_0)^n \quad \text{(eqn. 1)}$$

where $C_{sx}$ is defined as the nominal sense capacitance with no external excitation;

$C_o$ is the static term that is independent of displacement;

$\Delta$ is the displacement; and $g_0$ is the nominal gap with no external excitation.

For the differential sensor of FIG. 1, the net charge transfer in charge feedback mode can be made to be:

$$V_{out} \approx V_{dr} * ((C_{s1} - C_{s2})/(C_{s1} + C_{s2}))$$

$$V_{out} \approx V_{dr} * ((C_{sx+} - C_{sx-})/(2C_0 + C_{sx+} + C_{sx-})) \quad \text{(eqn. 2)}$$

with $C_{sx\pm} = \epsilon_o A/(g_o \pm \Delta)$ (eqn. 2)

For some devices the range of displacement may extend to 0.5 go or beyond. With $C_0 \approx 0.1 C_{sx}$ nonlinearities on the order of 2% or more may occur which is above the tolerance threshold for many applications.

Figure 3:
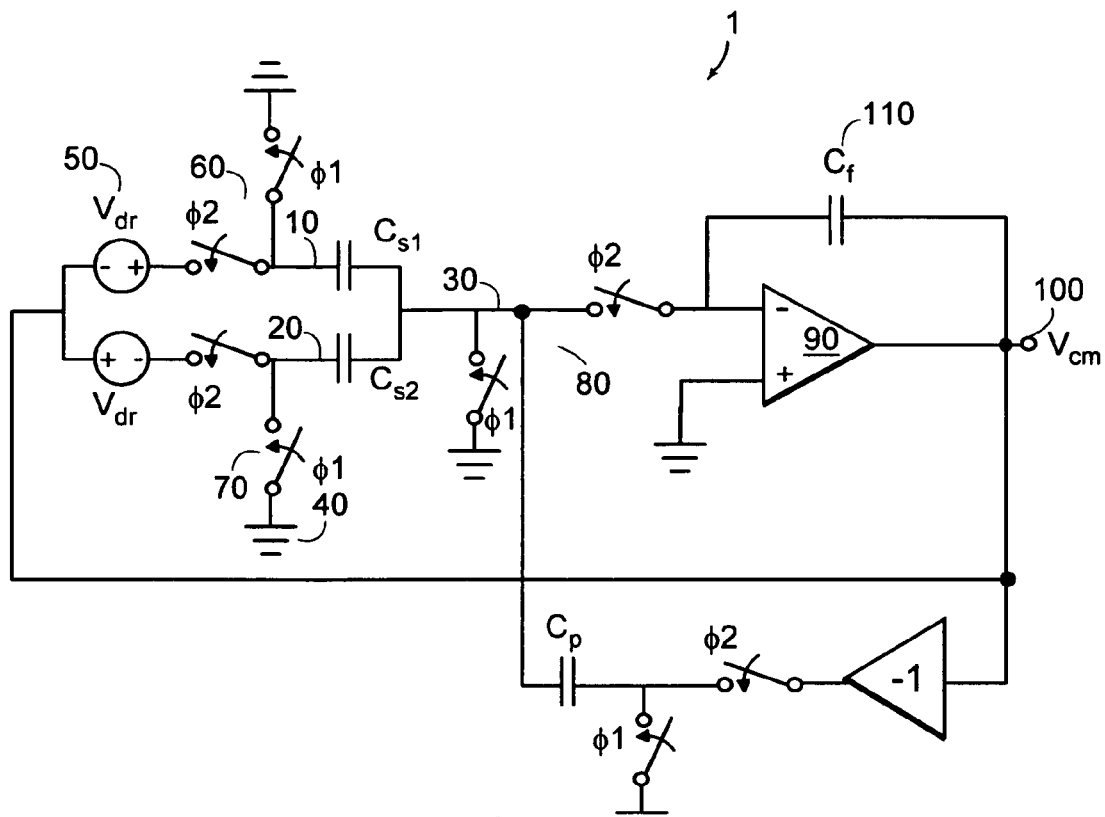
FIG. 3 shows a schematic diagram of an improved differential capacitive sensor according to an embodiment of the invention.

In a preferred embodiment of the invention, this nonlinearity may be reduced by the improved circuit shown schematically in FIG. 3. The output of the circuit may be inverted 140 and fed back to the movable electrode 30 through a modulator 120 and a fix-up capacitor, $C_p$ 130. The net charge transfer, if $C_p$ is equal to $C_o$, is:

$$V_{cm} \approx V_{dr} * \Delta/g_o \quad \text{(eqn. 3)}$$

and the nonlinearity of the output has been substantially reduced for large displacements.

Figure 4:
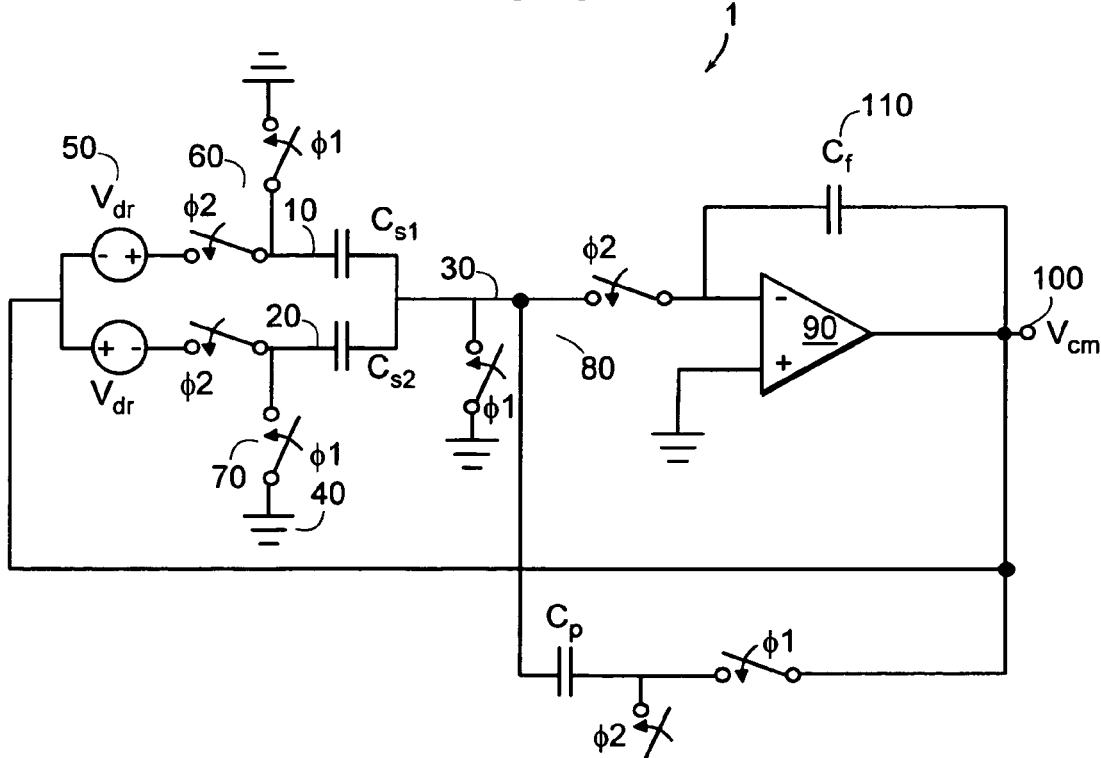
FIG. 4 shows a schematic diagram of an improved differential capacitive sensor according to another embodiment of the invention.

In a specific embodiment of the invention, as shown in FIG. 4, the inverter may be eliminated by reversing the phase of the modulator 120, effectively inverting the signal fed back to the movable electrode 30.

In other specific embodiments of the invention, the value of the fix-up capacitor may be determined analytically and trimmed during the manufacturing process to provide a given level of linearity as a function of the displacement of the beam.

Figure 5:
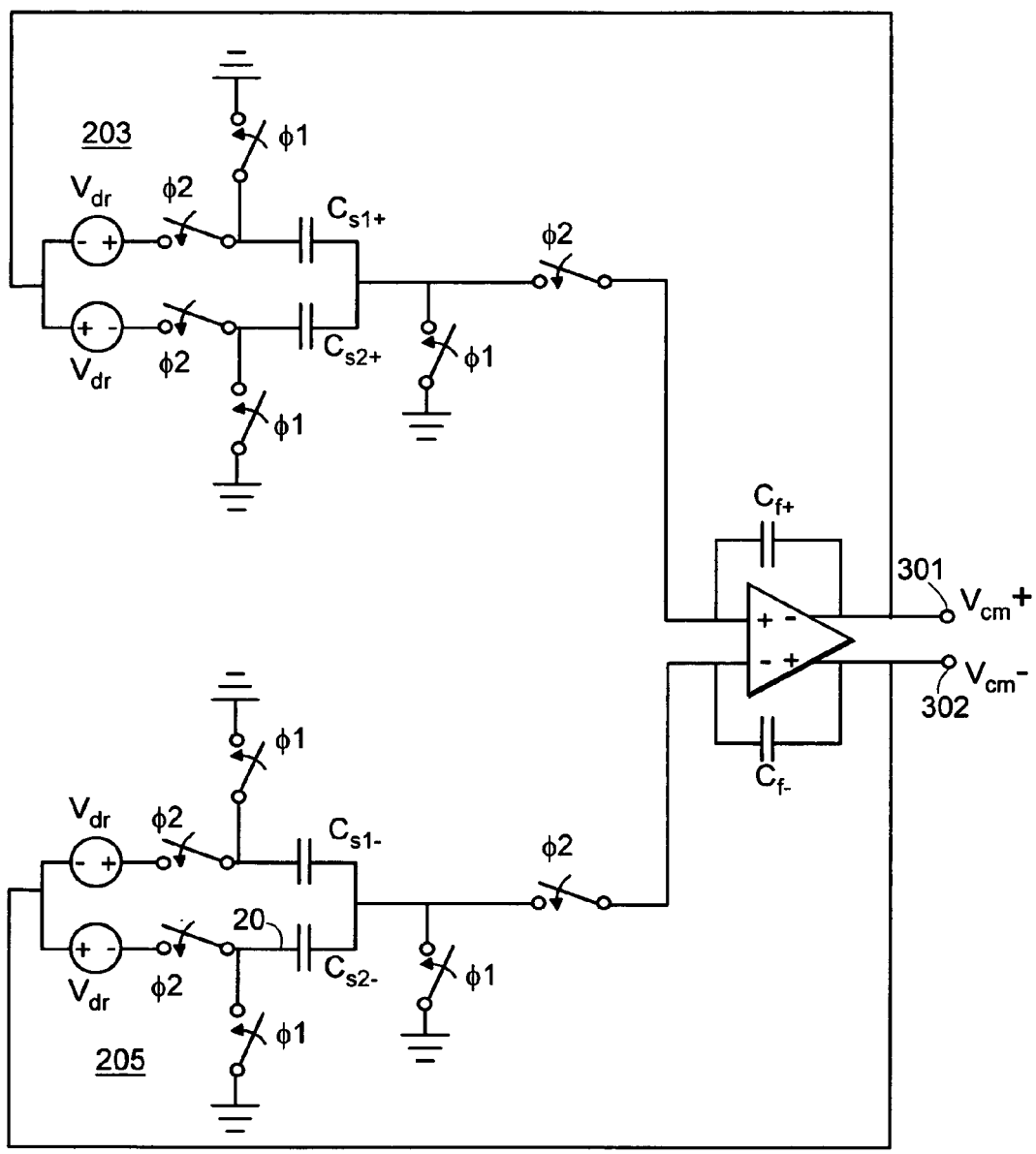
FIG. 5 is a schematic diagram of another prior art differential capacitive sensor.

Another example of a prior art accelerometer is shown in FIG. 5 (labeled generally 201). Two differential capacitive sensor accelerometers 203, 205 are coupled together mechanically, but isolated electrically. The electrical circuit for each accelerometer is implemented in an analogous fashion to the individual accelerometer circuits shown schematically in FIG. 1. The output of the sensor is a differential output 301, 303. The differential circuit reverses the voltage polarities, so one sensor creates a positive charge for a net sensor displacement, while the other sensor creates a negative charge. This polarity reversal helps to reject error sources like input switch charge injection and environmental coupling, since these are common to both terminals and therefore rejected.

Figure 6:
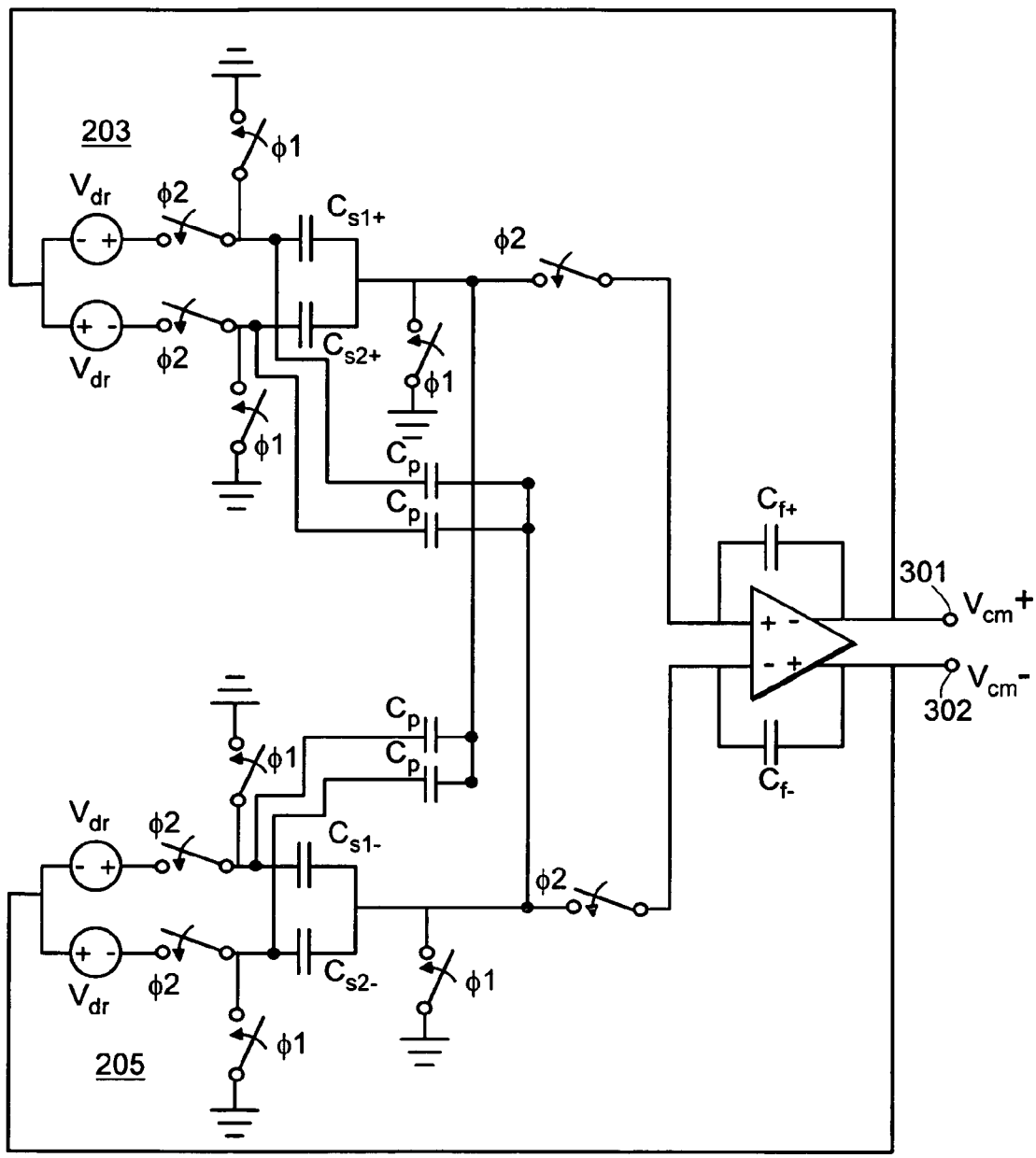
FIG. 6 is a schematic diagram of an improved differential capacitive sensor including a differential amplifier according to an embodiment of the invention.

In a preferred embodiment of the invention as shown in FIG. 6, cross-coupled fix-up capacitors $C_p$ are employed to cancel the effect of the fixed capacitance in the differential capacitors. As shown in FIG. 6, output $V_{cm-}$ 302 is coupled through DC potential $V_{dr}$, modulated and fed through a fix-up capacitor $C_p$ to the movable electrode of the opposite differential sensor. Since the voltage polarities are equal but opposite on the two sides of the sensor, the cross-coupling of the fix-up capacitors provides a convenient method for implementing a negative capacitance. Thus, the linearity of the output of the sensor may be improved.

In other embodiments of the invention, the use of negative capacitance, as described above, to improve linearity of response may be employed with other approaches that are used to sense acceleration with a differential capacitor. For example, the technique may be used with a force feedback approach.

Embodiments of the invention are not limited to any particular type of sensor such as the above described accelerometers. The invention may be included with any differential capacitive sensor to improve the linearity of the output. The techniques described above may be applied to a wide range of sensor assemblies for sensing parameters such as rotation, pressure, fluid level and the like. Other variations and modifications of the embodiments described above are intended to be within the scope of the present invention as defined in the appended claims.

What is claimed is:

1. An improved capacitive sensor comprising: a first electrode; a first driver for providing a first periodic signal to the first electrode; a second electrode; a second driver for providing a second periodic signal to the second electrode, the first and second periodic signals being out of phase with respect to each other; a third electrode between and movable relative to the first and second electrodes, the first, second, and third electrodes forming a differential capacitor; and signal processing circuitry including an amplifier coupled to the third electrode for providing an output signal, wherein the improvement comprises a feedback signal from the amplifier that is modulated, fed through a fix-up capacitor and coupled to the third electrode.

2. A sensor according to claim 1, wherein the fix-up capacitor value is set such that the linearity of the output signal as a function of the displacement of the third electrode relative to the first electrode is improved.

3. A sensor according to claim 1, wherein the feedback signal is phase shifted 180 degrees from the output signal.

4. A sensor according to claim 1, wherein the feedback signal is modulated with a square wave.

5. A sensor according to claim 1, wherein the fix-up capacitor value is approximately equal to a fixed portion of the capacitance between the first electrode and the third electrode, the fixed portion not varying as a function of the displacement of the first electrode from the third electrode.

6. A method for improving the linearity of response of a capacitive sensor, the method including:
   a. providing a capacitive sensor, the sensor comprising a first electrode; a first driver for providing a first periodic signal to the first electrode; a second electrode; a second driver for providing a second periodic signal to the second electrode, the first and second periodic signals being out of phase with respect to each other; a third electrode between and movable relative to the first and second electrodes, the first, second, and third electrodes forming a differential capacitor; and signal processing circuitry including an amplifier coupled to the third electrode for providing an output signal that is fed back to the first driver and the second driver; and
   b. providing a feedback signal from the output of the amplifier to the third electrode through at least one fix-up capacitor and a modulator.

7. A method according to claim 6, wherein the fix-up capacitor value is such that the linearity of the output signal as a function of the movement of the third electrode relative to the first electrode is improved.

8. A method according to claim 6, wherein the feedback signal is phase shifted 180 degrees from the output signal.

9. A method according to claim 6, wherein the feedback signal is modulated with a square wave.

10. A method according to claim 6, wherein the fix-up capacitor value is approximately equal to a fixed portion of the capacitance between the first electrode and the third electrode, the fixed portion not varying as a function of the displacement of the first electrode from the third electrode.

11. A method according to claim 6, wherein the output of the amplifier is a differential output.

12. An improved capacitive sensor comprising: a first electrode; a first driver for providing a first periodic signal to the first electrode; a second electrode; a second driver for providing a second periodic signal to the second electrode, the first and second periodic signals being out of phase with respect to each other; a first movable electrode between and movable relative to the first and second electrodes, the first, second, and first movable electrodes forming a differential capacitor; a third electrode; a third driver for providing a third periodic signal to the third electrode; a fourth electrode; a fourth driver for providing a fourth periodic signal to the fourth electrode, the third and fourth periodic signals being out of phase with respect to each other; a second movable electrode between and movable relative to the third and fourth electrodes, the third, fourth and second movable electrodes forming a differential capacitor; and signal processing circuitry including a differential amplifier, a first input of the differential amplifier coupled to the first movable electrode and a second input of the differential amplifier coupled to the second movable electrode for providing a differential output signal,
   wherein the improvement comprises a first feedback signal from the amplifier output that is modulated, fed through a first fix-up capacitor and coupled to the first movable electrode and a second feedback signal from the amplifier output that is modulated, fed through a second fix-up capacitor and coupled to the second movable electrode.

13. A sensor according to claim 12, wherein each feedback signal is modulated with a square wave.

14. A sensor according to claim 12, wherein the first fix-up capacitor value is approximately equal to a fixed portion of the capacitance between the first electrode and the first movable electrode, the fixed portion not varying as a function of the displacement of the first electrode from the first movable electrode.

15. A sensor according to claim 12, wherein the first feedback signal and the second feedback signal are cross-coupled to the first and second inputs of the differential amplifier.

16. An improved capacitive sensor comprising: a first electrode; a first driver for providing a first periodic signal to the first electrode; a second electrode; a second driver for providing a second periodic signal to the second electrode, the first and second periodic signals being out of phase with respect to each other; a third electrode between and movable relative to the first and second electrodes, the first, second, and third electrodes forming a differential capacitor; and signal processing circuitry including an amplifier coupled to the third electrode for providing an output signal,
   wherein the improvement comprises a negative capacitance from the amplifier output to the third electrode.

17. A sensor according to claim 16, wherein the value of negative capacitance is such that the linearity of the output signal as a function of the displacement of the third electrode relative to the first electrode is improved.

* * * * *